United States Patent [19]

Corley et al.

[11] Patent Number: 5,780,555
[45] Date of Patent: Jul. 14, 1998

[54] EPOXY RESIN SYSTEM

[75] Inventors: Larry Steven Corley, Houston; Kalyan Ghosh, Richmond; Joseph Michael Hunter; Derek Scott Kincaid, both of Houston; Leo Meilus, Cypress; Daniel James Weinmann, Houston, all of Tex.

[73] Assignee: Shell Oil Company, Houston, Tex.

[21] Appl. No.: 715,258

[22] Filed: Sep. 16, 1996

Related U.S. Application Data

[60] Continuation of Ser. No. 452,188, May 25, 1995, abandoned, which is a division of Ser. No. 290,649, Aug. 15, 1994, abandoned.

[51] Int. Cl.$^6$ ...................................................... C08G 65/32
[52] U.S. Cl. .......................... 525/407; 525/504; 525/523; 528/93; 528/110; 528/408; 528/421; 528/422; 252/174.21; 252/174.22
[58] Field of Search ........................... 525/523, 407, 525/504; 528/93, 110, 408, 421, 422; 252/174.21, 174.22

[56] References Cited

U.S. PATENT DOCUMENTS

| | | | |
|---|---|---|---|
| 3,423,345 | 1/1969 | Hsu et al. | 523/456 |
| 3,477,990 | 11/1969 | Dante et al. | 528/89 |
| 4,199,647 | 4/1980 | Newkirk et al. | 428/394 |
| 4,210,571 | 7/1980 | Herman | 523/200 |
| 4,210,572 | 7/1980 | Herman et al. | 260/40 |
| 4,440,882 | 4/1984 | Weiss et al. | 523/401 |
| 4,442,245 | 4/1984 | Weiss et al. | 523/401 |
| 4,474,678 | 10/1984 | Lutz et al. | 510/506 |
| 4,514,467 | 4/1985 | Riemer et al. | 428/413 |
| 4,628,080 | 12/1986 | Corley | 528/88 |
| 4,668,758 | 5/1987 | Corley | 528/91 |
| 4,734,468 | 3/1988 | Marx | 525/524 |
| 4,925,587 | 5/1990 | Schenker et al. | 510/506 |
| 5,124,074 | 6/1992 | Uchiyama et al. | 252/358 |
| 5,314,980 | 5/1994 | Morrison | 528/19 |

OTHER PUBLICATIONS

Lee et al. Handbook of Epoxy Resins. pp. 7–1 to 7–5, 7–30 and 7–31. McGraw Hill, 1982.

*Primary Examiner*—Randy Gulakowski
*Attorney, Agent, or Firm*—Dennis V. Carmen

[57] ABSTRACT

An amine curing agent composition for an epoxy resin is provided having low volatility and good processability containing a) a polyamine curing agent and b) an aliphatic alcohol-alkylene oxide adduct. An epoxy resin-polyamine curing agent system containing an aliphatic alcohol-alkylene oxide adduct is also provided.

21 Claims, No Drawings

EPOXY RESIN SYSTEM

This is a continuation of application Ser. No. 08/452,188, filed May 25, 1995 now abandoned, which is a division of application Ser. No. 08/290,649, filed Aug. 15, 1994 now abandoned.

FIELD OF THE INVENTION

This invention relates to epoxy resin systems. In one aspect, the invention relates to improved diluent-containing amine curing agent and epoxy resin systems.

BACKGROUND OF THE INVENTION

Typical epoxy resin systems for coatings and certain civil engineering applications such as in structural and flooring applications contain benzyl alcohol as diluent. Generally the diluent is added to the curing agent for the epoxy resin. Benzyl alcohol is used as a diluent to lower viscosity of the epoxy resin system for ease of processing. However, a large fraction of the diluent such as benzyl alcohol evaporates from a coating, or other exposed layer of epoxy resins during cure, and thereby behaves as a volatile organic compound (VOC). Environmentally it is desirable to have low VOC content.

It is therefore an object of the present invention to provide a diluent-containing epoxy resin system which has lower volatility than benzyl alcohol-containing epoxy resin systems while retaining their ease of processing.

SUMMARY OF THE INVENTION

According to the invention, an amine curing agent composition is provided comprising:

(a) a polyamine having at least 2 nitrogen atoms and at least two reactive amine hydrogen atoms, and (b) an aliphatic alcohol-alkylene oxide adduct.

Further, a curable epoxy resin composition comprising the amine curing agent is provided.

DETAILED DESCRIPTION OF THE INVENTION

It has been found that aliphatic alcohol-alkylene oxide adducts are effective diluents for amine curing agents and mixtures of these curing agents with epoxy resins. The amine curing agent composition and/or the curable epoxy resin composition of the invention has lower volatility and higher flash points than the corresponding composition containing the conventional benzyl alcohol diluent while having viscosity in the same range. Further, the aliphatic alcohol-alkylene oxide adduct does not react with aliphatic amine groups at room temperature at a rate high enough to threaten shelf stability when used as a diluent for epoxy curing agents containing amine groups.

The amine curing agent composition of the invention contains a polyamine, an aliphatic alcohol-alkylene oxide adduct and optionally an accelerator. The polyamine can be any nitrogen-containing curing agent useful in curing epoxy resins. These polyamines typically have at least 2 nitrogen atoms per molecule and at least two reactive amine hydrogen atoms per molecule. The nitrogen atoms are linked by divalent hydrocarbyl groups. Other hydrocarbyl groups such as aliphatic, cycloaliphatic or aromatic groups may also be singly linked to some of the nitrogen atoms. These polyamines contain at least 2 carbon atoms per molecule. Preferably polyamines contain about 2 to about 6 amine nitrogen atoms per molecule, 2 to about 8 amine hydrogen atoms per molecule, and 2 to about 50 carbon atoms.

Examples of the polyamines useful as a curing agent for epoxy resins include aliphatic polyamines such as ethylene diamine, diethylene triamine, triethylene tetramine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butane diamine, 1,3-butane diamine, 1,4-butane diamine, 1,5-pentane diamine, 1,6-hexane diamine, 2-methyl-1,5-pentanediamine, 2,5-dimethyl-2,5-hexanediamine and the like; cycloaliphatic polyamines such as isophoronediamine, 4,4'-diaminodicyclohexylmethane, menthane diamine, 1,2-diaminocyclohexane, 1,4-diaminocyclohexane, and diamines derived from "dimer acids" (dimerized fatty acids) which are produced by condensing the dimer acids with ammonia and then dehydrating and hydrogenating; adducts of amines with epoxy resins such as an adduct of isophoronediamine with a diglycidyl ether of a dihydric phenol, or corresponding adducts with ethylenediamine or m-xylylenediamine; araliphatic polyamines such as 1,3-bis(aminomethyl)benzene; aromatic polyamines such as 4,4'-methylenedianiline, 1,3-phenylenediamine and 3,5-diethyl-2,4-toluenediamine; amidoamines such as condensates of fatty acids with diethylenetriamine, triethylenetetramine, etc; and polyamides such as condensates of dimer acids with diethylenetriamine, triethylenetetramine, etc. Some commercial examples of polyamines include EPI-CURE® Curing Agent 3140 (a dimer acid-aliphatic polyamine adduct), EPI-CURE® Curing Agent 3270 (a modified aliphatic polyamine), EPI-CURE® Curing Agent 3274 (a modified aliphatic polyamine), EPI-CURE® Curing Agent 3295 (an aliphatic amine adduct), EPI-CURE® Curing Agent 3282 (an aliphatic amine adduct), EPI-CURE® Curing Agent 3055 (an amidoamine), EPI-CURE® Curing Agent 3046 (an amidoamine) and EPI-CURE® Curing Agent 3072 (modified amidoamine), and EPI-CURE® Curing Agent 3483 (an aromatic polyamine) available from Shell Chemical Company. Mixtures of polyamines can also be used.

The aliphatic alcohol-alkylene oxide adduct useful as the diluent has the general formula:

$$R_1-(O-CR_2R_3-CR_4R_5)_n-OH \qquad (II)$$

wherein $R_1$ is a hydrocarbyl group having 7 to 22 carbon atoms, preferably 8 to 18 carbon atoms, $R_{2-5}$ are independently hydrogen or $C_{1-4}$ alkyl group, preferably all hydrogen, and n is a number having an average value of 1 to 15, preferably 1 to 5. The hydrocarbyl group can optionally be substituted with groups inert to the amine curing agent such as, for example, other hydrocarbyl groups or alkoxy, aryloxy, alkylthio, arylthio, amino groups and the like. If the value of n is low such as 1, the adduct will tend to have poor solubility in epoxy resins, especially if the number of carbon atoms in $R_1$ is high such as greater than 22. If the value of n is high such as greater than 16, resin solubility of the adduct may be excellent but the adduct will have less power to reduce system viscosity. The preferred hydrocarbyl group is a linear alkyl group in which the substituent is bound to a primary carbon atom of the alkyl chain $R_1$ although aliphatic alcohol-alkylene oxide adducts in which the ether substituent is bound to a secondary carbon atom of the alkyl chain are also considered to be within the scope of this invention as well as any mixtures thereof. Aliphatic alcohol-alkylene oxide adducts in which branching occurs within the alkyl chain are also considered to be within the scope of the present invention. The preferred aliphatic alcohol-alkylene oxide adduct is an alcohol ethoxylate, an alcohol propoxylate or a mixture thereof. Some aliphatic alcohol ethoxylates useful in the present invention include, but are not limited to those described in U.S. Pat. No. 4,474,678.

The aliphatic alcohol-alkylene oxide adduct of formula II may be made by any conventional process known in the art including, but not limited to, the processes described in U.S. Pat. No. 4,474,678. Such processes typically consist of the sequential addition of alkylene oxide to the corresponding alkanol (ROH) in the presence of a catalyst. Some commercial examples of the alcohol-alkylene oxide adduct include Neodol® alcohol ethoxylates (from Shell Chemical Company) such as NEODOL® 91-2.5, NEODOL® 91-6, NEODOL® 45-2.25, NEODOL® 45-7, NEODOL® 45-13, NEODOL® 25-3, NEODOL® 25-9, NEODOL® 25-12, NEODOL® 1-5, NEODOL® 23-3 and NEODOL® 23-1 ethoxylates, Neodol® alkoxylates containing propoxylate groups such as NEODOL® 375 propoxylate, DOBANOL alkoxylates (registered trademark of Shell International Petroleum Company, Ltd.), and Tergitol alcohol alkoxylates (Union Carbide).

The aliphatic alcohol-alkylene oxide adduct is present in an amount effective to dilute the amine curing agent or the epoxy resin system to obtain a processable viscosity which is generally less than about 50,000 centipoise or 50 Pa.s (at 25° C.), preferably within the range of about 3000 centipoise to about 10 centipoise. It can be appreciated that when the curing agent or the epoxy resin system is handled or processed at higher temperature the viscosity can be lower, which range is within the scope of the invention. The aliphatic alcohol-alkylene oxide adduct is typically present in an amount of from about 1 weight percent, preferably from about 3 weight percent, more preferably from about 5 weight percent to about 300 weight percent, preferably to about 200 weight percent, more preferably to about 150 weight percent, based on the polyamine. The polyamine and the aliphatic alcohol-alkylene oxide adduct are blended or mixed with any kind of blender, stirrer or mixer to give an intimate mixture.

An accelerator can be included to increase the cure rate of the epoxy resin-curing agent system. Various amine-compatible accelerators can be used as long as they are soluble in the amine curing agents. Examples of accelerators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; and imides such as, for example, phthalimide, succinimide, perylenetetracarboxylic diimide and saccharin.

When the cure rate at the desired temperature is suboptimal, it is preferable to include the accelerator. For example, for adhesive applications and civil engineering applications where application at low temperature is desired, it may be preferable to include the accelerator. It is particularly preferable to include the accelerator if the amine groups are hindered or the concentration of amine groups is low. The accelerators are typically present in an amount of from about 0, preferably from about 0.1 weight percent to about 10 weight percent, preferably to 5 weight percent, based on the epoxy resin.

More preferable accelerators for the invention include, for example, calcium alkylbenzenesulfonates, dicyandiamide, calcium nitrate, magnesium alkanesulfonates, tetrafluoroboric acid, salicylic acid, phenol, dichloroacetic acid, trifluoroacetic acid, and mercaptoacetic acid.

The curable epoxy resin composition of the invention contains an epoxy resin, a polyamine, an aliphatic alcohol-alkylene oxide adduct and optionally an accelerator. The aliphatic alcohol-alkylene oxide adduct, the polyamines and the accelerators are described above.

The epoxy resin can be any epoxy resin which can be cured by the amine curing agent. Generally, the epoxy resin can be any curable epoxy resin having a 1,2-epoxy equivalency greater than one and preferably, on the average, more than about 1.5 epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. They may be monomeric or polymeric, liquid or solid, but are preferably liquid at room temperature. Suitable epoxy reins include glycidyl ethers prepared by reacting epichlorohydrin with a compound containing at least one hydroxyl group carried out under alkaline reaction conditions. Examples of epoxy resins suitable for use in the invention include polyglycidyl ethers of polyhydric compounds, epoxy novolacs or similar polyphenolic resins, polyglycidyl ethers of glycols or polyglycols, and polyglycidyl esters of polycarboxylic acids.

Preferably the epoxy resin is a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those described in U.S. Pat. Nos. 3,477,990 and 4,734,468. Commercial examples of preferred epoxy resins include, for example, EPON® Resins DPL-862, 828, 826, 825 and 1001 available from Shell Chemical Company.

The preferred epoxy resin systems of the invention for structural applications contain epoxy resins based on or containing diglycidyl ethers of dihydric phenols, a curing agent containing an aliphatic polyamine (modified or not), and an aliphatic alcohol-alkylene oxide adduct diluent. The preferred epoxy systems of the invention for coating applications contain diglycidyl ethers of dihydric phenols, and/or the fusion products of the diglycidyl ethers of dihydric phenols with bisphenols, a curing agent containing a polyamide or a polyamidoamine, and a aliphatic alcohol-alkylene oxide adduct diluent.

The epoxy resin can be blended or mixed with the diluent-containing amine curing agent or blended with the polyamine, the aliphatic alcohol-alkylene oxide adduct and optionally the accelerator simultaneously or in any order at a temperature below the cure temperature which is typically below about 100° C. The ratio of epoxy resin to polyamines is typically within the range of about 10:90 to about 90:10, more preferably about 20:80 to about 80:20 by weight percent.

Further to facilitate handling or application or use in various environments, the amine curing agent or the epoxy resin system can be further diluted with minor amounts of aliphatic, aromatic or cycloaliphatic ketones or esters.

The curable epoxy resin composition can be cured at a temperature within the range of from about −40° C., preferably from about −10° C., to about 100° C., preferably to about 75° C. for a time effective to cure the epoxy resin.

The epoxy resin composition of the invention may include other additives, such as fillers, elastomers, stabilizers, extenders, plasticizers, pigments, reinforcing agents, flow control agents and flame retardants depending on the application. The epoxy resin composition is useful for coatings and certain civil engineering applications such as for floor topping, grouts and adhesives.

For coating applications, the curable epoxy resin composition can also contain pigments of the conventional type such as iron oxides, lead oxides, strontium chromate, carbon black, titanium dioxide, talc, barium sulfate, phthalocyanine blue and green, cadmium red, chromic green, lead silicate, silica, silicates and the like. Such pigments can be added to the polyamine curing agent component or the epoxy resin component prior to mixing them together. However, iron blue pigment, calcium carbonate and pigments considered reactive because of their basic nature are not compatible in the epoxy resin coating system when used in appreciable quantities. These normally are added to the curing agent component only. Defoamers, tints, slip agents, thixotropes, etc., are common auxiliary components to most coatings and may be employed in the epoxy resin composition of the present invention.

The curable coating composition can be applied to a substrate by brush, spray, or rollers. One of the advantages of the coating system of the invention is the lower VOC content (i.e., from about 0 to about 20%) of the curable coating composition.

For floor topping application, the curable epoxy resin composition can also contain a filler such as sand, other siliceous materials, iron or other metals. Small amounts of thixotropic agents, coloring agents, inert plasticizers, and leveling agents can also be incorporated in the curable epoxy resin composition if desired. These curable flooring compositions can be trowelled, sprayed or brushed on to a floor substrate.

Illustrative Embodiment

The following illustrative embodiments describe the process of the invention and are provided for illustrative purposes and are not meant as limiting the invention.

Examples 1–5 demonstrate use of aliphatic alcohol-alkylene oxide adducts as diluents for amine curing agents, EPICURE® 3140 curing agent (a condensate of dimerized fatty acid with an aliphatic polyamine from Shell Chemical Company), an adduct of isophoronediamine with EPON® Resin 828 (from Shell Chemical Company), a cycloaliphtic amine curing agent, a modified araliphatic amine epoxy curing agent and a polyamide type epoxy curing agent, respectively, compared with benzyl alcohol as diluent. Examples 6 and 7 demonstrate use of aliphatic alcohol-alkylene oxide diluents with accelerators. Further, Examples 2–7 demonstrate the epoxy resin systems of the invention.

NEODOL® alcohol ethoxylates mentioned in the examples below were obtained from Shell Chemical Company.

NEODOL® 91-2.5 alcohol ethoxylate (a linear alcohol ethoxylate mixture having an average of 2.7 ethoxylate groups and 9 to 11 carbon linear alcohol moiety).

NEODOL® 23-3 alcohol ethoxylate (a linear alcohol ethoxylate mixture having an average of 2.9 ethoxylate groups and 12 to 13 carbon linear alcohol moiety).

TESTING METHODS

Viscosity:
Viscosities were measured at 25° C. using an Ubbelohde viscometer.

Pot life:
Pot life was determined in a Shyodu gel time apparatus using a 100 gram sample, starting at room temperature (approximately 20°–22° C.). "Pot life" was time required for the probe to stop rotating.

Gel Time:
Gel time was determined in a thin film on a heated metal gel plate. An amount of resin (about 1 gram) was periodically touched with a wooden tongue depressor. "Gel time" was the time required for the curing mixture to stop being drawn up in fibrous strings when touched by the tongue depressor.

Pencil Hardness:
Pencil hardness was determined by ASTM D3363 method.

Direct Impact and Reverse Impact:
Direct impact and reverse impact were determined by ASTM D2794 method.

Adhesion, Crosscut:
Crosscut adhesion was determined by ASTM D3359 method.

Flexibility:
Conical mandrel flexibility was determined by ASTM D522 method.

Dry Time:
Dry time of films was determined by a Gardner circular dry time device with a probe moving through the coating as it dried overnight.

Volatility (VOC CONTENT):
Volatility or VOC was determined by ASTM D-2369 method.

Heat Distortion Temperature:
Heat distortion temperature was determined by ASTM D-648 method.

Tensile Strength, Modulus and Elongation:
Tensile strength, modulus and elongation were determined by ASTM D-638 method.

Flexural Strength and Modulus:
Flexural strength and modulus were determined by ASTM D-790 method.

Fracture Toughness:
Fracture toughness was determined by ASTM E-399 method.

Hardness:
Hardness, Shore "D" was determined by ASTM D-2240 method.

EXAMPLE 1

Use of two aliphatic alcohol ethoxylates, NEODOL® 91-2.5 ethoxylate and NEODOL® 23-3 ethoxylate as diluents in comparison with benzyl alcohol for a dimer acid-aliphatic polyamine adduct curing agent, EPI-CURE® 3140 curing agent, is demonstrated.

EPI-CURE® 3140 curing agent was blended with benzyl alcohol, NEODOL® 91-2.5 and NEODOL® 23-3 ethoxylates in the proportions indicated in Table 1 below. Kinematic viscosity of the mixtures was measured.

TABLE 1

| EPI-CURE ® 3140 (parts) | 50 | 50 | 50 | 50 | 50 | 50 |
|---|---|---|---|---|---|---|
| Benzyl alcohol (parts) | 5 | 10 | | | | |
| NEODOL ® 91-2.5 (parts) | | | 5 | 10 | | |
| NEODOL ® 23-3 (parts) | | | | | 5 | 10 |
| Kinematic viscosity, (mm²/sec) | 6750 | 3890 | 7350 | 4070 | 7050 | 4430 |

As can be seen from Table 1, the aliphatic alcohol ethoxylate diluents gave mixture kinematic viscosities almost as low as those provided by benzyl alcohol at equivalent diluent fraction. This was despite the fact that the kinematic viscosities of the aliphatic alcohol ethoxylates at 38° C. are 12 mm²/sec for NEODOL® 91-2.5 ethoxylate and 13 mm²/sec for NEODOL® 23-3 ethoxylate while the benzyl alcohol has a kinematic viscosity of 4.5 mm²/sec even at the much lower temperature of 30° C.

EXAMPLE 2

Use of NEODOL® 91-2.5 and NEODOL® 23-3 ethoxylates in comparison with benzyl alcohol as diluents in formulating a curing agent which is an adduct of isophoronediamine with EPON® Resin 828 is demonstrated.

A 1-liter, 4-neck round bottom flask was fitted with a paddle stirrer, an air condenser (topped by a connection to a nitrogen line through a Firestone valve), a thermocouple, and an addition funnel. To the flask were added 263.05 grams of isophoronediamine and 252.91 grams of the particular diluent used. To the addition funnel was added a mixture of 97.95 grams of EPON® Resin 828 and 32.5 grams of the particular diluent used. The system was purged with nitrogen and the resin mixture was added to the amine mixture over approximately 30–45 minutes, with stirring. The mixture was heated to 82°–90° C. and kept in this temperature range for 1 hour to bring the amine-epoxy reaction to near completion. The product was then poured into a glass bottle and stored for further characterization, as shown in Table 2 below.

TABLE 2

| Diluent | Benzyl Alcohol | NEODOL ® 91-2.5 | NEODOL ® 23-3 |
|---|---|---|---|
| Diluent Properties:[a] | | | |
| Kinematic viscosity (mm²/sec) | 4.5 (30° C.) | 12 (38° C.) | 14 (38° C.) |
| Curing agent properties: | | | |
| Kinematic viscosity (mm²/sec) | 328.5 | 472.2 | 500.7 |
| Processing properties:[b] | | | |
| Pot life, (min) | 97.6 | 240.6 | 233.4 |
| Thin film gel time (sec) | | | |
| 50° C. | 3600 | | |
| 90° C. | 570 | 1210 | 1250 |
| 120° C. | 195 | 375 | 375 |

[a]Kinematic viscosity of benzyl alcohol is taken from J.A. Riddick and W.B. Bunger, Organic Solvents: Physical Properties and Methods of Purification, Volume II in Techniques of Chemistry, A. Weissberger, ed., New York: Wiley-Interscience, 1970.
[b]Properties of mixtures of 62.5 parts by weight EPON ® Resin 828 with 37.5 parts by weight of the particular curing agent used.

As can be seen from Table 2 above, the kinematic viscosity of the curing agents containing the alcohol ethoxylate diluents was not tremendously higher than that of the curing agent containing benzyl alcohol diluent. The alcohol ethoxylate containing systems were lower in reactivity than the benzyl alcohol-containing system, an advantage in some applications in which a long working life is needed.

EXAMPLE 3

Use of NEODOL® 23-3 ethoxylate in comparison with benzyl alcohol as diluent in a phenolic-accelerated formulated cycloaliphatic amine curing agent is demonstrated.

A 1-liter, 4-neck round bottom flask was equipped as in Example 2. To the flask were added 221.40 grams of isophoronediamine. To the addition funnel were added 61.80 grams of EPON® Resin 828. The system was purged with nitrogen and the resin was added to the amine over approximately 30–45 minutes, with stirring. The mixture was heated to 82°–90° C. and kept in this temperature range for 1 hour to bring the amine-epoxy reaction to near completion. To the flask were added 144.00 grams of para-t-butylphenol and 172.80 grams of the particular diluent used. The mixture was heated to 82°–90° C. and kept in this temperature range for 1 hour with stirring to yield a homogeneous mixture. The product was then poured into a glass bottle and stored for further characterization.

The curing agents produced were characterized by using them to cure EPON® Resin 828. For performance characterization, ⅛" (3.2 mm) thick castings were prepared in molds formed from two pieces of ¼" (6.4 mm) thick plate glass separated by a ⅛" (3.2 mm) thick polytetrafluoroethylene spacer. Film properties were visually characterized from 15 mil (0.38 mm) drawdowns cast over ¼" (6.4 mm) thick plate glass. Results are shown in Table 3 below.

TABLE 3

| Curing agent formulation: | | |
|---|---|---|
| Isophoronediamine (pbw) | 36.9 | 36.9 |
| EPON ® Resin 828 (pbw) | 10.3 | 10.3 |
| NEODOL ® 23-3 (pbw) | 28.8 | |
| Benzyl alcohol (pbw) | | 28.8 |
| p-tert-Butylphenol (pbw) | 24.0 | 24.0 |
| Volatility, (% loss): | | |
| Resin/curing agent blend[a] | 4.71 | 8.97 |
| Curing agent | 61.17 | 79.26 |
| NEODOL ® 23-3 alone | 23.52 | |
| Benzyl alcohol alone | | 99.31 |
| Curing Agent properties: | | |
| Viscosity (mPa · s) | 1730 | 1340 |
| Processing properties:[a] | | |
| Pot life (min)[b] | 35 | 23 |
| Cured state properties:[a,c] | | |
| Heat distortion temperature (°C.) | 47 | 45 |
| Tensile: Strength (MPa) | 45 | 47 |
| Modulus (GPa) | 2.48 | 2.73 |
| Elongation (%) | 5.4 | 6.2 |
| Flexural: Strength (MPa) | 84 | 81 |
| Modulus (GPa) | 2.51 | 2.88 |
| Fracture toughness (MPa – m$^{1/2}$) | 0.64 | 0.70 |
| Hardness (Shore "D") | 69 | 72 |
| Film properties:[a] | | |
| Film formation, 24 ambient cure | Smooth film | Smooth film |
| Film clarity, 24 hr ambient cure | Clear | Clear |
| Sweatout, 24 hr ambient cure | None | None |
| Adhesion, 24 hr ambient cure | Good | Good |
| Film clarity, 24 hr ambient cure plus 24 hour water soak | Clear | Clear |
| Adhesion, 24 hr ambient cure plus 24 hour water soak | Fair | Good–Fair |

TABLE 3-continued

| Solvent pickup (%):[a,c] | | |
|---|---|---|
| Water, 24 hours | 0.19 | 0.18 |
| Water, 1 week | 0.62 | 0.72 |
| 5% Acetic acid, 24 hours | 0.47 | 0.31 |
| 5% Acetic acid, 1 week | 1.39 | 0.91 |
| Xylene, 24 hours | 1.94 | 0.31 |
| Xylene, 1 week | 11.84 | 1.50 |

[a]Properties of mixtures of 61.3 parts by weight EPON ® Resin 828 with 38.7 parts by weight of the particular curing agent mixture used.
[b]Determined on a sample in a ½-pint metal can. Mixture was probed with a probe every 1 to 2 minutes. The pot life was considered to have elapsed when the sample behaved in a gel-like manner when probed.
[c]Samples conditioned 2 weeks at 25° C. prior to testing.

As can be seen from Table 3 above, substitution of NEODOL® 23-3 ethoxylate for benzyl alcohol in the curing agent formulation produces a large decrease in the volatile organic compound fraction of the resin-curing agent mixture. There is little change in cured casting or film properties except for xylene pickup after long exposure.

EXAMPLE 4

The use of NEODOL® 91-2.5 ethoxylate and NEODOL® 23-3 ethoxylate in comparison with benzyl alcohol as modifiers in the synthesis of modified araliphatic amine epoxy curing agents is demonstrated.

To a four-necked flask equipped with a stirrer, a temperature controller, and a condenser, 2266.86 grams of meta-xylylenediamine (MXDA) and 896.3 grams of deionized water were charged under a nitrogen blanket. Acrylic acid (622.5 g) was metered into the reaction mixture at 43°–46° C. over 90 minutes. The reaction temperature was maintained at 43°–46° C. over the next two hours to complete the Michael addition reaction between MXDA and acrylic acid. The reaction mixture was then heated to 199° C. (heated slowly through the range 93°–107° C. to facilitate the condensation reaction between the acid functionality of the acrylic acid and the residual amine functionality of the MXDA) to complete the condensation reaction. The base curative was characterized to have the properties summarized in Table 4.

TABLE 4

| Amine value (mg KOH/g) | 495 |
|---|---|
| Acid value (mg KOH/g) | 1.88 |
| Viscosity (Ubbelohde, Pa · s at 25° C.) | 18.96 |
| Color (Gardner) | <1 |

The base curative was cooled to 93° C. The base curative (80 parts by weight) was blended with 20 parts by weight of benzyl alcohol, NEODOL® 91-2.5 ethoxylate and NEODOL® 23-3 ethoxylate respectively. These three modified araliphatic amine curative analogs were characterized to have the properties summarized in Table 5. As can be seen from the results in Table 5, the aliphatic alcohol-alkylene oxide adduct containing polyamine curing agents have lower volatile organic compound (VOC) content then the corresponding benzyl alcohol containing polyamine curing agent.

TABLE 5

| Diluent | Benzyl Alcohol | NEODOL ® 91-2.5 | NEODOL ® 23-3 |
|---|---|---|---|
| Amine value (mg KOH/g) | 394 | 397 | 396 |
| Acid value (mg KOH/g) | 0.65 | 0.74 | 0.80 |
| Viscosity (Ubbelohde, Pa · s at 25° C.) | 1.99 | 2.97 | 3.75 |
| Volatility (% loss) | 31.71 | 21.93 | 19.58 |
| Color (Gardner) | <1 | <1 | <1 |
| Gel time[a] | 27.3 | 40.5 | 37.1 |
| Density (g/cm³) | 1.13 | 1.09 | 1.09 |

[a]Shyodu, minutes at 25° C.; 100 g mass, 54.2 phr with EPON ® Resin 828

The curing agents produced were characterized by using them to cure EPON® Resin 828. The EPON® Resin 828, in amounts indicated in Table 6 below, was initially diluted with a 50:40:10 (by weight) mixture of xylene:methyl isobutyl ketone (MIBK):methyl n-amyl ketone (MnAK). The curing agent was then added to the diluted resin, followed by the 3M FC-430 flow control agent. After thorough mixing, the mixture was then diluted further with an amount of a 70:30 (by weight) mixture of xylene:n-butanol in order to achieve a Gardner-Holdt viscosity of D. The diluted mixture of resin and curing agent was then allowed to stand for a 10 minute induction period at room temperature. The mixture was then coated onto a set of 15 cold-rolled steel panels (prerinsed with isopropyl alcohol and then with methyl ethyl ketone) with a #25 drawdown bar. The resultant films were allowed to cure under ambient conditions and cured properties of the films (shown in Table 6 below) were determined after 24 hours and again after 7 days. Dry time was determined by a Gardner circular dry time device with a probe moving through the coating as it dried overnight. Dry time results are shown in Table 6 below.

TABLE 6

| | | | |
|---|---|---|---|
| EPON ® Resin 828, grams | 30 | 30 | 30 |
| 50 xylene: 40 MIBK: 10 MnAK, grams | 5.76 | 5.76 | 5.76 |
| Diluent in curing agent | Benzyl alcohol | NEODOL ® 91-2.5 | NEODOL ® 23-3 |
| Curing agent, grams | 16.2 | 16.2 | 16.2 |
| 3M FC-430 (leveling agent), grams | 0.115 | 0.115 | 0.115 |
| 70 xylene: 30 n-butanol, grams | 5.0 | 5.0 | 5.0 |
| Film properties: | | | |
| Dry time (Gardner circular), hours: | | | |
| Channel formation begins | 0.5 | 0.25 | |
| Clear channel (bare metal) | 1.5 | 0.5 | 3.0 |
| End of clear channel | 3.0 | 1.0 | 4.0 |
| End of surface rupture | 4.5 | 2.0 | |
| End of surface scratching | 5.5 | 4.0 | 18.0 |
| Properties after 24 hours: | | | |
| Visual appearance | Clear hard film | Clear hard film | Clear hard film |
| Film thickness mm | 0.030–0.043 | 0.025–0.038 | 0.020–0.028 |
| Pencil hardness (ASTM D3363) | 3H | 2H | 2H |
| Properties after 7 days: | | | |
| Pencil hardness (ASTM D3363) | 3H | 3H | 3H |

TABLE 6-continued

| | | | |
|---|---|---|---|
| Direct impact, J (ASTM D2794) | 3.2 | 3.6 | 2.7 |
| Reverse impact, J (ASTM D2794) | 0.5 | 0.2 | 0.2 |
| Adhesion, crosscut (ASTM D3359) | 5A | 5A | 5A |
| Flexibility, conical mandrel (ASTM D522), % elongation | 32 | 32 | 32 |
| Methyl isobutyl ketone resistance | >120 min. pass/pencil #H | >120 min. pass/pencil #H | >120 min. pass/pencil #H |

As can be seen from the results in Table 6 above, cure behavior (with the exception of Gardner circular dry time for the system modified with NEODOL® 23-3 ethoxylate) and cured properties after 24 hours and 7 days are similar for the three systems, with no major differences due to the substitution of linear alcohol ethoxylates for benzyl alcohol.

EXAMPLE 5

The use of NEODOL® 91-2.5 ethoxylate and NEODOL® 23-3 ethoxylate in comparison to benzyl alcohol as modifiers in the synthesis of a polyamide type epoxy curing agent is demonstrated.

To a four-necked flask equipped with a stirrer, a temperature controller and a condenser, 469.2 grams of Z 4¼ dimer acid (dimerized fatty acid) and 869.1 grams of a crude mixture of monomeric and dimerized acids were charged under a nitrogen blanket. The monomer-dimer acid mixture was pre-warmed to 40° C. before charging. The reaction mixture was heated to 100° C. with moderate agitation. Triethylenetetramine (TETA) (561.6 grams) was metered into the reaction mixture at 100°–120° C. over 1 hour. The reaction mixture was heated slowly to 210° C. with nitrogen sparging after onset of the condensation reaction between the acid and the amine. At 210° C., the pressure inside the flask was gradually decreased from atmospheric to 13 kPa in order to increase the imidazoline content of the curative to a target value. The base curative was characterized to have the properties summarized in Table 7.

TABLE 7

| | |
|---|---|
| Amine value (mg KOH/g) | 336 |
| Acid value (mg KOH/g) | 1.2 |
| Viscosity (Ubbelohde, Pa · s at 25° C.) | 20.03 |
| Color (Gardner) | 8–9 |

The base curative was cooled to 71° C. The base curative (63.08 parts by weight) was blended with 31.93 parts by weight of benzyl alcohol, NEODOL® 91-2.5 ethoxylate and NEODOL® 23-3 ethoxylate respectively. Each of the above modified curatives was adducted with 5 parts by weight of EPON® Resin 828 at 80° C. over 2 hours. The EPON® Resin 828 was added to the reaction mixture at 40°–50° C. and heated to 80° C. after a mild exotherm up to 60° C. These three curative analogs were characterized to have the properties summarized in Table 8. As can be seen from the results in Table 8, the aliphatic alcohol-alkylene oxide adduct containing polyamine curing agents have lower volatile organic compound (VOC) content then the corresponding benzyl alcohol containing polyamine curing agent.

TABLE 8

| Diluent | Benzyl alcohol | NEODOL® 91-2.5 | NEODOL® 23-3 |
|---|---|---|---|
| Amine value (mg KOH/g) | 211 | 210 | 210 |
| Acid value (mg KOH/g) | 1.27 | 1.33 | 0.92 |
| Viscosity (Ubbelohde, Pa · s at 25° C.) | 3.88 | 5.85 | 7.10 |
| Volatility (% loss) | 32.85 | 12.90 | 8.90 |
| Color (Gardner) | 7–8 | 7–8 | 7–8 |
| Gel time[a] | 158 | 356 | 359 |
| Density (g/cm$^3$) | 1.003 | 0.962 | 0.961 |

[a]Shyodu, minutes at 25° C.; long mass, 70 phr with EPON® Resin 828.

The curing agents produced were characterized by using them to cure EPON® Resin 1001 from Shell Chemical Company. The EPON® Resin 1001 was used as EPON® Resin 1001-CX-75, a 75% by weight solids solution of EPON® Resin 1001 in a 65:35 (by weight) mixture of methyl isobutyl ketone (MIBK):xylene. This solution was further diluted with the amount indicated in Table 9 below of a 50:40:10 (by weight) mixture of xylene:methyl isobutyl ketone (MIBK):methyl n-amyl ketone (MnAK). The curing agent was then added to the resin solution, followed by the 3M FC-430 flow control agent. The diluted mixture of resin and curing agent was then allowed to stand for a 10 minute induction period at room temperature. The mixture was then diluted further with an amount of a 70:30 (by weight) mixture of xylene:n-butanol in order to achieve a Gardner-Holdt viscosity of D. The mixture was then coated onto a set of 15 cold-rolled steel panels (prerinsed with isopropyl alcohol and then with methyl ethyl ketone) with a #35 drawdown bar. The resultant films were allowed to cure under ambient conditions and cured properties of the films (shown in Table 9 below) were determined after 24 hours and again after 7 days. Dry time was determined by a Gardner circular dry time device with a probe moving through the coating as it dried overnight. Dry time results are also shown in Table 9 below.

TABLE 9

| | | | |
|---|---|---|---|
| EPON® Resin 1001-CK-75 (grams) | 40 | 40 | 40 |
| 50 xylene: 40 MIBK: 10 MnAK (grams) | 13.4 | 13.4 | 13.4 |
| Diluent in curing agent | Benzyl alcohol | NEODOL® 91-2.5 | NEODOL® 23-3 |
| Curing agent (grams) | 21 | 21 | 21 |
| 3M FC-430 (leveling agent) (grams) | 0.254 | 0.254 | 0.254 |
| 70 xylene: 30 n-butanol (grams) | 14 | 16 | 16 |
| Film properties: Dry time (Gardner circular), hours: | | | |
| Channel formation begins | 0.5 | 1.0 | 0.75 |
| Clear channel (bare metal) | 1.0 | 2.0 | 3.5 |
| End of clear channel | 4.0 | 4.0 | 5.25 |
| End of surface rupture | 5.5 | 7.5 | 7.5 |
| End of surface scratching | 0.0 | 9.0 | 8.25 |
| Properties after 24 hours: | | | |
| Visual appearance | Clear hard film | Clear hard film | Clear hard film |
| Film thickness, mm | 0.025–0.030 | 0.030–0.036 | 0.025–0.033 |
| Pencil hardness | F | HB | HB |

TABLE 9-continued

| Properties after 7 days: | | | |
|---|---|---|---|
| Pencil hardness | 3H | HB | 2H |
| Direct impact (J) | ≧18.1 | ≧18.1 | 17.2 |
| Reverse impact, (J) | ≧18.1 | ≧18.1 | ≧18.1 |
| Adhesion, crosscut | 5A | 5A | 5A |
| Flexibility, conical mandrel (% elongation) | 32 | 32 | 32 |
| Methyl isobutyl ketone resistance | Failed at 15 minutes | Failed at 15 minutes | Failed at 15 minutes |

As can be seen from Table 9 above, cure behavior and cured properties (with the exception, to some degree, of hardness) after 24 hours and 7 days are similar for the three systems, with no major differences due to the substitution of linear alcohol ethoxylates for benzyl alcohol.

EXAMPLE 6

Use of a calcium sulfonate accelerator with NEODOL® 91-2.5 ethoxylate in comparison with benzyl alcohol as diluent in formulating a curing agent which is an adduct of isophoronediamine with EPON® Resin 828 is demonstrated.

A 1-liter, 4-neck round bottom flask was equipped as in Example 2. To the flask were added 263.05 grams of isophoronediamine, 187.81 grams of NEODOL® 91-2.5 ethoxylate and 65.2 grams of Ninate 401 (a product of Stepan Chemical, a liquid mixture of 65% calcium sulfonates (corresponding approximately to calcium dodecylbenzenesulfonate) and 35% of a solvent mixture). To the addition funnel was added a mixture of 97.95 grams of EPON® Resin 828 and 32.5 grams of NEODOL® 91-2.5 ethoxylate. The system was purged with nitrogen and the resin mixture was added to the amine mixture over approximately 30-45 minutes, with stirring. The mixture was heated to 82°–90° C. and kept in this temperature range for 1 hour to bring the amine-epoxy reaction to near completion. The product was then poured into a glass bottle and stored for further characterization, as shown in Table 10 below.

TABLE 10

| Curing agent formulation: | | | | | |
|---|---|---|---|---|---|
| Mixture from Example text above (pbw) | 100 | 50 | 25 | | |
| NEODOL ® 91-2.5 mixture from Table 2 (pbw) | | 50 | 75 | 100 | |
| Benzyl alcohol mixture from Table 2 (pbw) | | | | | 100 |
| Curing agent properties: | | | | | |
| Kinematic viscosity (mm²/sec) | 1128 | 710.5 | 573.5 | 472.2 | 328.5 |
| Processing properties:ᵃ | | | | | |
| Kinematic viscosity (mm²/sec) | 2700 | 1700 | 1600 | 1500 | 1350 |
| Viscosity doubling time (min) | 10 | 16 | 33 | 41 | 20 |
| Pot life (min) | 37.1 | 91.2 | 149.1 | 240.6 | 97.6 |
| Thin film gel time (sec) | | | | | |
| 50° C. | 2750 | 3575 | 6100 | | 3600 |
| 90° C. | 380 | 610 | 860 | 1210 | 570 |
| 120° C. | 100 | 158 | 240 | 375 | 195 |
| Volatility (% loss): | | | | | |
| Resin/curing agent blendᵃ | | 2.4% | | | 7.4% |

TABLE 10-continued

| Cured properties:ᵃ | | |
|---|---|---|
| Shore D hardness (20 gram casting, 17 hours after mixing) | 40–45 | 60–65 |
| Thin film appearance (17 hours after mixing) | Glossy but somewhat opaque | Glossy, clear |
| Thin film hardness (2 days after mixing) | HB-H | 2H |

ᵃProperties of mixtures of 62.5 parts by weight EPON ® Resin 828 with 37.5 parts by weight of the particular curing agent mixture used.

As can be seen from Table 10 above, the curing agent with slightly over one-fourth of the NEODOL® 91-2.5 ethoxylate replaced by Ninate 401 gave reactivity with EPON® Resin 828 considerably higher than that of the curing agent containing benzyl alcohol, although the viscosity of the Ninate 401 blend was much higher. When the Ninate 401 concentration was cut in half, the reactivity of the resultant curing agent with EPON® Resin 828 was about the same as that of the unaccelerated curing agent containing benzyl alcohol. Although the kinematic viscosity of the resultant curing agent containing NEODOL® 91-2.5 ethoxylate and Ninate 401 was more than twice that of the unaccelerated curing agent containing benzyl alcohol, there was only a small difference in kinematic viscosity (1350 versus 1700 mm²/sec) between mixtures of the two curing agents with EPON® Resin 828.

EXAMPLE 7

Use of dicyandiamide accelerator with NEODOL® 91-2.5 ethoxylates in comparison with benzyl alcohol as diluent in formulating a curing agent which is an adduct of isophoronediamine with EPON® Resin 828 is demonstrated.

To 1-pint bottles were added the proportions indicated in Table 11 below of isophoronediamine and dicyandiamide. The bottles were held in an 82° C. oven for approximately one hour to dissolve most of the dicyandiamide in the amine; placing the bottles on rollers overnight at room temperature completed the dissolution. To the resultant mixtures were added the proportions indicated in Table 11 below of EPON® Resin 828 and NEODOL® 91-2.5. The bottles were shaken until the mixtures were homogeneous (slight warming occurred as a result of the reaction exotherm). The mixtures were then allowed to stand at room temperature for 3 to 5 days. The curing agent products were then characterized as shown in Table 11 below.

TABLE 11

| Curing agent formulation: | | | | |
|---|---|---|---|---|
| Isophoronediamine (pbw) | 40.47 | 40.47 | 40.47 | 40.47 |
| EPON ® Resin 828 (pbw) | 15.07 | 15.06 | 15.07 | 15.07 |
| NEODOL ® 91-2.5 (pbw) | 37.84 | 39.85 | 43.91 | |
| Benzyl alcohol (pbw) | | | | 43.91 |
| Dicyandiamide (pbw) | 6.07 | 4.05 | | |
| Curing agent properties: | | | | |
| Kinematic viscosity (mm²/sec) | 1668 | | 472.2 | 328.5 |
| Amine value (mg KOH/g) | | | 271.9 | 272.3 |
| Processing properties:ᵃ | | | | |
| Kinematic viscosity (mm²/sec) | | | 1500 | 1350 |
| Viscosity doubling time (min) | | | 41 | 20 |

TABLE 11-continued

| | | | | |
|---|---|---|---|---|
| Pot life, 100 gram mass (min) | 74.9 | 101.0 | 240.6 | 97.6 |
| Thin film gel time (sec) | | | | |
| 50° C. | 4410 | 5150 | | 3600 |
| 90° C. | 760 | 775 | 1210 | 570 |
| 120° C. | 200 | 200 | 375 | 195 |

<sup>a</sup>Properties of mixtures of 62.5 parts by weight EPON ® Resin 828 with 37.5 parts by weight of the particular curing agent mixture used.

As can be seen from Table 11 above, dicyandiamide is also a relatively effective accelerator which can be used to give the curing agent diluted with NEODOL® 91-2.5 ethoxylate a reactivity similar to that diluted with benzyl alcohol, at least in terms of pot life in a 100-gram mass. Dicyandiamide has an additional advantage of not increasing the color of the curing agent.

We claim:

1. A curable epoxy resin composition comprising:
   (a) one or more epoxy resins,
   (b) one or more polyamine curing agent for epoxy resins having at least 2 nitrogen atoms and at least 2 amine hydrogen atoms, and
   (c) from about 1 to about 300 weight percent, based on the polyamine, of a diluent comprising an aliphatic alcohol-alkylene oxide adduct, solubilized in said one or more epoxy resins, having the formula:

$$R_1-(O-CR_2R_3-CR_4R_5)_n-OH$$

wherein $R_1$ is a hydrocarbyl group having 7 to 22 carbon atoms, $R_{2-5}$ are independently hydrogen or $C_{1-4}$ alkyl groups and n is a number having an average value of 1 to 5.

2. The composition of claim 1 wherein $R_1$ is a linear alkyl group.

3. The composition of claim 2 wherein n is a number having an average value of 1 to 5.

4. The composition of claim 3 wherein $R_{2-5}$ are all hydrogen.

5. The composition of claim 1 wherein the aliphatic alcohol-alkylene oxide adduct is an alcohol ethoxylate, an alcohol propoxylate or a mixture thereof.

6. The composition of claim 1 wherein the polyamine is selected from the group consisting of aliphatic amines, cycloaliphatic amines, adducts of amines with epoxy resins, aromatic amines, amidoamines and polyamides.

7. The composition of claim 1 wherein the epoxy resin is a polyglycidyl ether of a polyhydric phenol.

8. A curable coating composition comprising the curable epoxy resin composition of claim 1.

9. A curable flooring composition comprising the curable epoxy resin composition of claim 1.

10. A substrate coated with the curable epoxy resin composition of claim 1.

11. A cured composition of claim 1.

12. The curable epoxy resin composition of claim 1, further containing additives selected from the group consisting of fillers, elastomers, stabilizers, extenders, plasticizers, pigments, reinforcing agents, flow control agents, flame retardants, defoamers, slip agents, thixotropes, and leveling agents.

13. The curable epoxy resin composition of claim 1 wherein the aliphatic alcohol-alkylene oxide adduct of component (c) is present in an amount from about 5 weight percent to about 300 weight percent, based on the polyamine.

14. A curable epoxy resin composition comprising:
   (a) one or more epoxy resins,
   (b) one or more polyamine curing agents having at least 2 nitrogen atoms and at least 2 amine hydrogen atoms, and
   (c) an effective amount of a diluent comprising an aliphatic alcohol-alkylene oxide adduct solubilized in said one or more epoxy resins, having the formula:

$$R_1-(O-CR_2R_3-CR_4R_5)_n-OH$$

wherein $R_1$ is a hydrocarbyl group having 7 to 22 carbon atoms, $R_{2-5}$ are independently hydrogen or $C_{1-4}$ alkyl group and n is a number having an average value of 1 to 5, to provide a curable epoxy resin composition having a viscosity of less than about 50 Pa.s.

15. The composition of claim 14 further comprising an accelerator.

16. The composition of claim 15 wherein the accelerator is selected from the group consisting of metal salts and complexes thereof, inorganic acids, carboxylic acids, phenolic compounds, imidazoles, dicyandiamide, cyanamide, sulfonamides and imides.

17. A substrate coated with the curable epoxy resin composition of claim 14.

18. A cured composition of claim 14.

19. The curable epoxy resin composition of claim 14, further containing additives selected from the group consisting of fillers, elastomers, stabilizers, extenders, plasticizers, pigments, reinforcing agents, flow control agents, flame retardants, defoamers, slip agents, thixotropes, and leveling agents.

20. A curable epoxy resin composition comprising the reaction product of:
   (a) one or more epoxy resins,
   (b) one or more polyamine curing agents for epoxy resins having at least 2 nitrogen atoms and at least 2 amine hydrogen atoms, and
   (c) from about 1 to about 300 weight percent, based on a polyamine, of a diluent comprising an aliphatic alcohol-alkylene oxide adduct having the formula:

$$R_1-(O-CR_2R_3-CR_4R_5)_n-OH$$

wherein $R_1$ is a hydrocarbyl group having 7 to 22 carbon atoms, $R_{2-5}$ are independently hydrogen or $C_{1-4}$ alkyl groups, and n is a number having an average value of 1 to 5, wherein the curing reaction between said epoxy resin and polyamine is initiated by application of heat at temperatures ranging from $-10°$ C. to about $100°$ C.

21. A curable non-aqueous epoxy resin composition comprising:
   (a) one or more epoxy resins,
   (b) one or more polyamine curing agents for epoxy resins having at least 2 nitrogen atoms and at least 2 amine hydrogen atoms, and
   (c) from about 1 to about 300 weight percent, based on a polyamine, of a diluent comprising an aliphatic alcohol-alkylene oxide adduct having the formula $$R_1-(O-CR_2R_3-CR_4R_5)_n-OH$$

wherein $R_1$ is a hydrocarbyl group having 7 to 22 carbon atoms, $R_{2-5}$ are independently hydrogen or $C_{1-4}$ alkyl groups, and n is a number having an average value of 1 to 5.

* * * * *